United States Patent
Aiso et al.

(10) Patent No.: US 7,403,626 B2
(45) Date of Patent: Jul. 22, 2008

(54) LEVEL ADJUSTMENT APPARATUS

(75) Inventors: Masaru Aiso, Hamamatsu (JP); Akio Suyama, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 611 days.

(21) Appl. No.: 10/617,106

(22) Filed: Jul. 9, 2003

(65) Prior Publication Data

US 2004/0008852 A1 Jan. 15, 2004

(30) Foreign Application Priority Data

Jul. 15, 2002 (JP) ............... 2002-205404

(51) Int. Cl.
*H03G 3/00* (2006.01)
*H03G 5/00* (2006.01)
*H03G 9/00* (2006.01)
*H03G 7/00* (2006.01)
*H04B 1/00* (2006.01)
*H04B 1/20* (2006.01)

(52) U.S. Cl. ............... 381/104; 381/107; 381/109; 381/102; 381/103; 381/106; 381/119; 369/4

(58) Field of Classification Search ............... 381/119, 381/102–109, 197; 369/3, 4
See application file for complete search history.

(56) References Cited

U.S. PATENT DOCUMENTS 5,054,077 A * 10/1991 Suzuki ............... 381/109
6,985,595 B2 * 1/2006 Kohyama et al. ........... 381/119

2001/0055401 A1 12/2001 Yamada et al.
2002/0136419 A1 * 9/2002 Santos ............... 381/119

FOREIGN PATENT DOCUMENTS

| JP | 62-21621 | 2/1987 |
| JP | 3-58351 | 3/1991 |
| JP | 8-130427 | 5/1996 |
| JP | 11-296172 | 10/1999 |

* cited by examiner

*Primary Examiner*—Vivian Chin
*Assistant Examiner*—Devona E. Faulk
(74) *Attorney, Agent, or Firm*—Morrison & Foerster LLP

(57) ABSTRACT

Arrangements are made such that a plurality of operators, such as faders, can be set to opposite operational directions. When any one of the operators has been operated in a particular direction, a control value of each of the other operator, set to the same operational direction as the operated operator, is controlled in the same direction as the particular operated direction, while a control value of each of the other operators, set to the opposite operational direction from the operated operator, is controlled in the opposite direction from the particular operated direction. Where control values of a plurality of channels are to be controlled via a collective control controller, each of the channels is set to a forward or inverse operational direction. Thus, even faders that are to be operated in opposite directions can be appropriately operated collectively as a group.

6 Claims, 5 Drawing Sheets

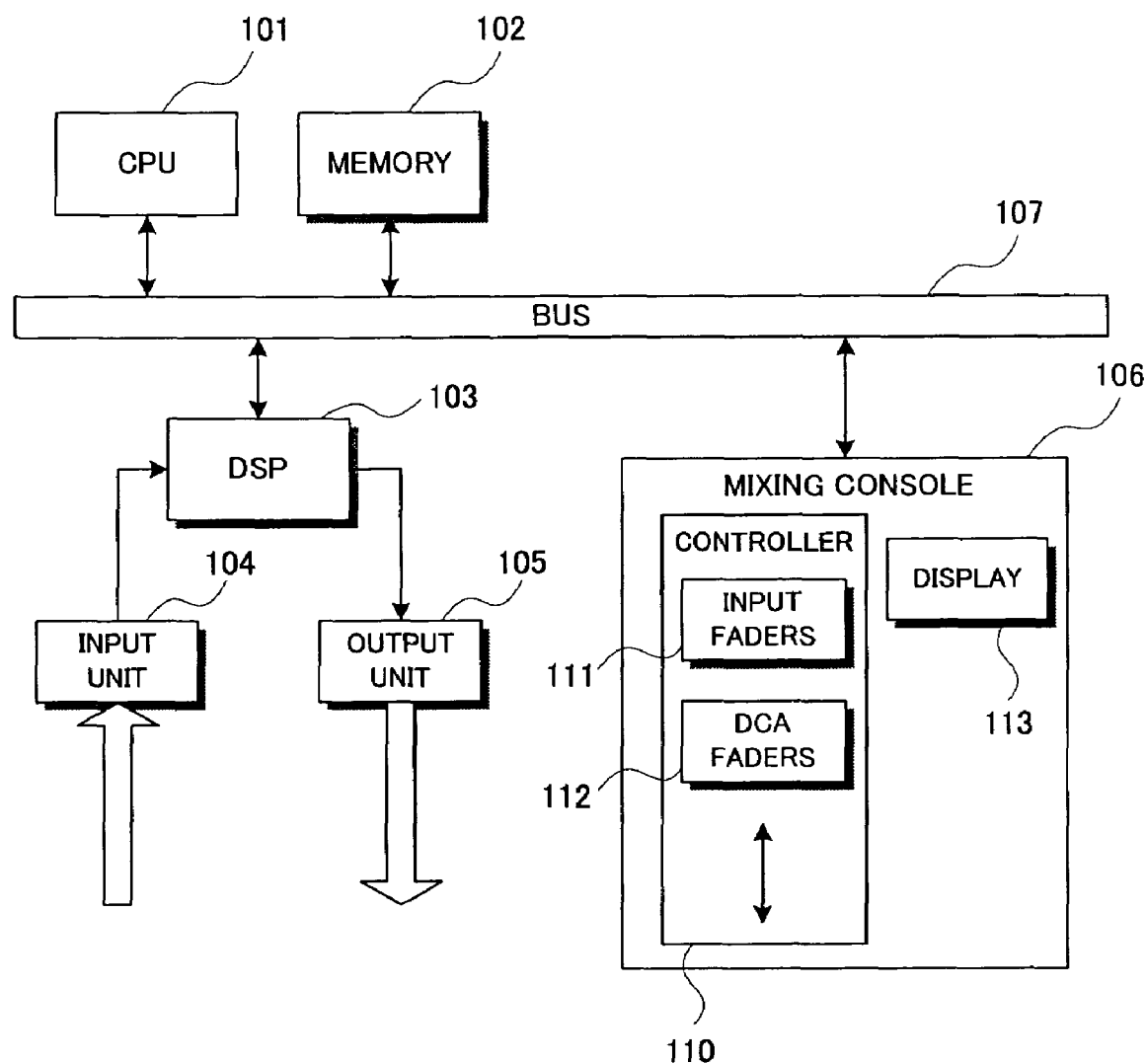
F I G. 1

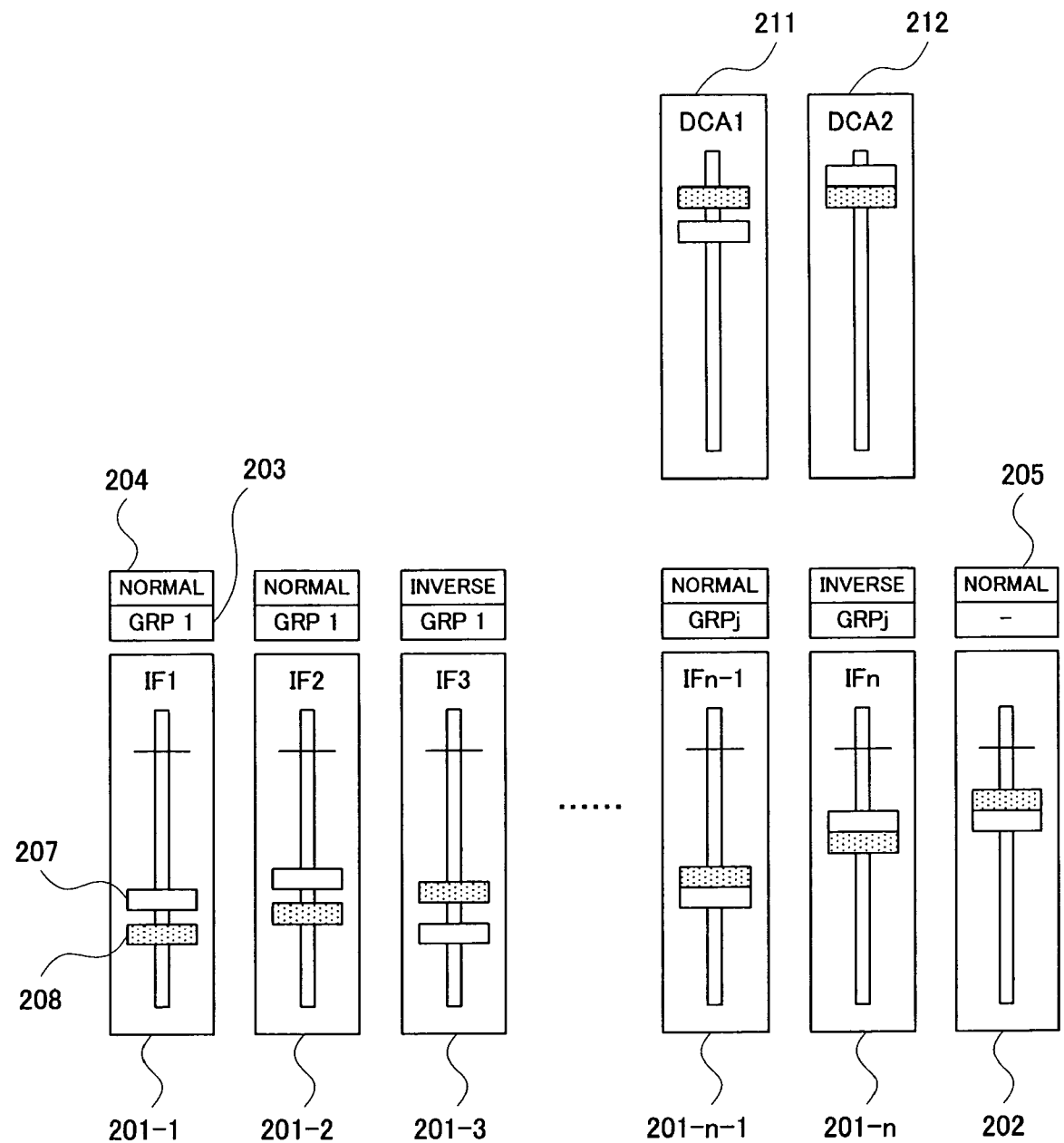
F I G. 2

| DCA CH | ASSIGNED INPUT CH | NML/INV |
|---|---|---|
| 1 | 2 | NORMAL |
|  | n−1 | INVERSE |
|  | ⋮ |  |
| 2 | 1 | NORMAL |
|  | 3 | INVERSE |
|  | ⋮ |  |

ASSIGNMENT TABLE

LEVEL ADJUSTMENT APPARATUS

BACKGROUND OF THE INVENTION

The present invention relates to an improved level adjustment apparatus applicable to apparatus (e.g., audio mixers) including a multiplicity of operators (operating members), such as faders, so as to readily adjust a plurality of kinds of levels in a collective fashion.

Mixer apparatus intended to control various audio equipment in a centralized manner have been employed in various places where concerts, dramatic performance, etc. are given. The mixer apparatus include a multiplicity of operators (operating members), such as faders, so as to adjust various kinds of levels per channel. Particularly, there has been known a type of mixer apparatus which permits grouping of the faders so that tone volume levels of two or more faders can be increased or decreased in a collective fashion, Specifically, in such mixer apparatus, two or more faders are previously defined or set as a fader group so that, when any one of the faders in the group has been operated to increase or decrease the level, the levels of the other faders in the group are automatically increased or decreased in synchronism with the increased or decreased level of the operated fader. Note that each of the faders is a so-called "moving fader" operatively connected to a motor.

The above-mentioned technique of grouping a plurality of faders is very convenient because the user can collectively operate two or more faders whose levels are to be operated in the same level increasing or level decreasing direction. However, there would sometimes arise a need for two faders in a given group to be operated in opposite directions, such as when tone volume crossfade is to be carried out. In such a case, the user of the conventional mixer apparatus has no choice but to simultaneously operate two faders in opposite directions, i.e. level increasing and level decreasing directions, and therefore the user sometimes can not appropriately carry out desired crossfade.

SUMMARY OF THE INVENTION

In view of the foregoing, it is an object of the present invention to provide a level adjustment apparatus which is designed to allow a user to collectively operate a plurality of operators, such as faders, as an operator group and which advantageously allows the user to appropriately operate even faders of a particular fader group that are to be operated in opposite directions.

In order to accomplish the above-mentioned object, the present invention provides a level adjustment apparatus including a plurality of operators each operable in both a level increasing direction and a level decreasing direction, which comprises: a setting section that individually sets each of the plurality of operators to a forward (normal) or inverse operational direction; and a level control section that, when any one of the operators is operated in a particular direction, controls a control value of each of other operators, set to the same operational direction as the operated operator, in the same direction as the particular operated direction of the one operator, and controls a control value of each of the other operators, set to the opposite operational direction from the operated operator, in the opposite direction from the particular operated direction.

According to another aspect of the present invention, there is provided a level adjustment apparatus for controlling control values of a plurality of channels each controllable in both a level increasing direction and a level decreasing direction, which comprises: a collective control operator that collectively controls the control values of the plurality of channels; a setting section that individually sets each of the plurality of channels to a forward (normal) or inverse operational direction; and a level control section that, when the collective control operator is operated in a particular direction, controls the control value of each of the channels, set to the forward operational direction, in the same direction as the particular operated direction of the collective control operator, and controls the control value of each of the channels, set to the inverse operational direction, in the opposite direction from the particular operated direction.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 1 is a block diagram showing a general setup of a system to which is applied a level adjustment apparatus constructed in accordance with an embodiment of the present invention;

FIG. 2 is an outer view of a plurality of faders on a mixing console of FIG. 1;

DETAILED DESCRIPTION OF THE EMBODIMENTS

Figures 3A, 3B:
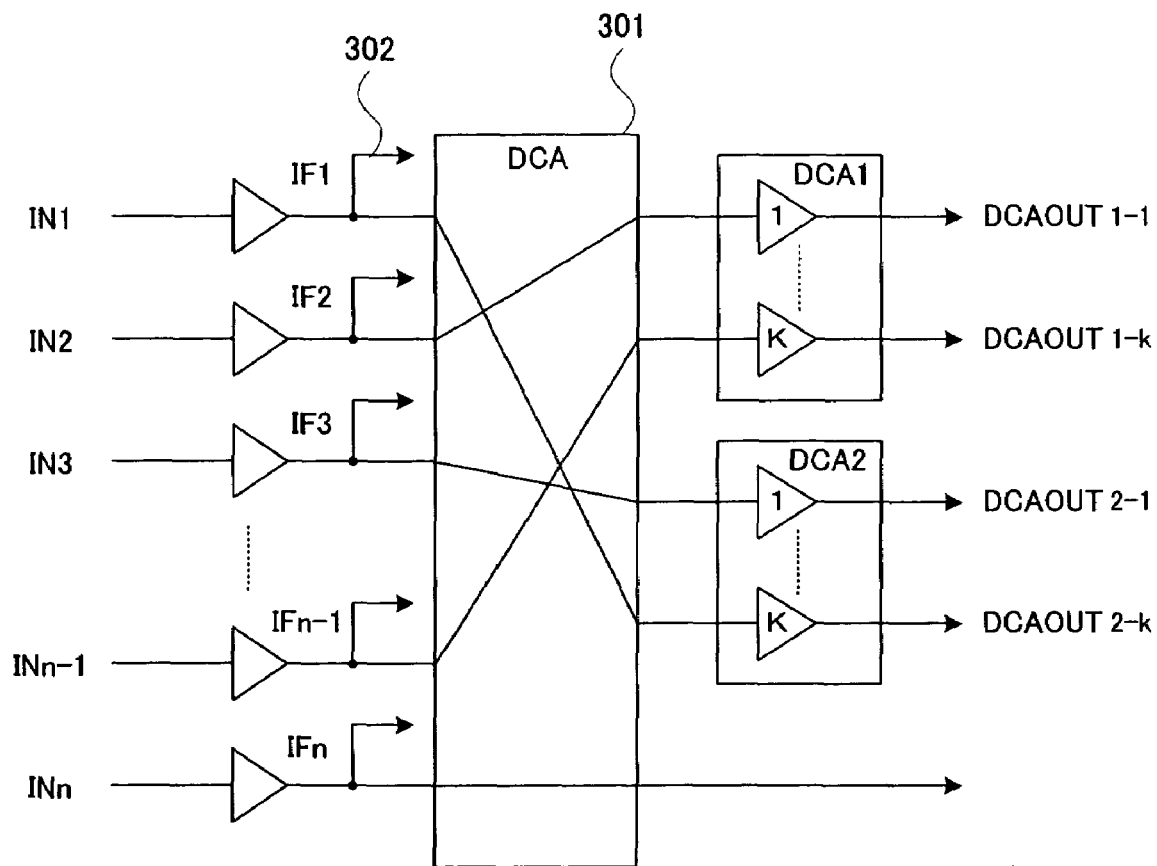
FIGS. 3A and 3B are a functional block diagram and a table diagram which show an example of assignment, of input faders, to DCA operators of FIG. 2.

FIG. 1 is a block diagram showing a general setup of a system to which is applied a level adjustment apparatus constructed in accordance with an embodiment of the present invention. This system is a digital mixer having a plurality of input and output channels. The digital mixer includes a central processing unit (CPU) 101, a memory 102, a digital signal processor (DSP) 103, an input unit 104, an output unit 105, a mixing console 106 and a bus 107. The CPU 101 controls operation of the entire digital mixer. The memory 102 stores therein various programs to be executed by the CPU 101 and various data to be used by the CPU 101. The DSP 103 performs mixing processing on signals, input via the input unit 104, in accordance with instructions given from the CPU 101, and outputs the mixing-processed signals via the output channel 105. The input unit 104 is a unit where there can be provided a plurality of A/D converter boards for receiving audio signals via microphones or the like and converting the received audio signals into digital signals. The output unit 105 is a unit where there can be provided a plurality of D/A converter boards for converting the digital signals, output from the DSP 103, into analog signals and outputting the thus-converted analog signals to speakers or the like. The mixing console 106 is provided for manipulation or operation by the user, and it includes an outer panel on which are provided a controller 110 having a plurality of operators (operating members) and a display 113. The controller 110 includes at least a plurality of input faders 111 and a plurality of DCA (acronym for Digital Controlled Amplifier or Attenuator) faders 112. The input faders 111 are moving faders connected to motor drives. Once a knob of any desired one of the input faders is touched by the user, the corresponding motor drive is turned off so that the desired fader can be operated manually by the user.

FIG. 2 is an outer view of the input and DCA faders provided on the mixing console 106. Reference numerals 201-1 to 202-n represent the input faders, each of which can be set to Forward (Normal) and Inverse operational directions. These input faders 201-1 to 202-n will be collectively called an "input fader group". Reference numeral 202 represents a fader for adjusting an overall tone volume level. Reference numerals 211 and 212 represent the DCA faders. The input fader 201-1 includes an operating knob 207, and a shaded (halftone) portion 208 in the figure represents an exemplary position of the operating knob 207 having been operated by the user. The input fader 201-1 also includes a grouped-state display section (e.g., LCD) 203, provided in its upper end portion, for displaying a grouped state of the fader 201-1. The input fader 201-1 also includes an operational-direction display section 204, provided in its upper end portion above the grouped-state display section 203, for displaying a virtual operational direction of the knob of the fader 201-1 where the fader 201-1 is to be operated in response to an actually-operated fader belonging to the same group as the fader 201-1. Each of the other input faders 201-2 to 201-n and 202 too includes a grouped-state display section and an operational-direction display section similar to those of the fader 201-1.

More specifically, the mixer apparatus of FIG. 1 can group the input faders as desired. In the illustrated example of FIG. 2, the faders 201-1 to 201-3 are grouped or set as Group 1, and thus "GRP1" is displayed on their respective grouped-state display sections. Further, the faders 201-n-1 and 201-n are set as Group j, and thus "GRPj" is displayed on their respective grouped-state display sections.

In grouping the faders, the operational directions of the individual faders can be set as desired by means of predetermined setting operators (e.g., predetermined operators on the controller 110 and/or a pointing device etc. connected to the mixing console 106). In the illustrated example of FIG. 2, the input faders 201-1 and 201-2 in Group 1 are set to a forward or normal operational direction, and thus "Normal" is displayed on their respective operational-direction display sections. Also, the input fader 201-3 in Group 1 is set to an inverse operational direction, and thus "Inverse" is displayed on its operational-direction display section. Each of the faders set to the inverse operational direction operates in the opposite direction from the faders set in the forward (normal) operational direction. In the illustrated example of FIG. 2, as the knob 207 of the fader 201-1 in Group 1 is operated in a downward (level decreasing) direction to the position indicated at 208, the fader 201-2 in the same group (Group 1) automatically operates in the same downward (level decreasing) direction, while the fader 201-3 automatically operates in the opposite, i.e. upward, direction. Of course, any one of the faders in a desired group may be operated in any desired direction; any one of the faders, set to the inverse operational direction, in the desired group may be operated. For example, as the fader 201-3, set to the inverse operational direction in Group 1, is operated, the other faders 201-1 and 201-2, set to the forward direction in the same group, automatically operate in the opposite direction from the operated direction of the fader 201-3.

Further, in the mixer apparatus of FIG. 1, the outputs of desired ones of the above-mentioned input faders can each be assigned to one of the DCA operators 211 and 212 by means of predetermined setting operators (e.g., operators on the controller 110 and/or the pointing device etc. connected to the mixing console 106), so that the signals of the individual channels, having been controlled in level via the input faders, can be further level-controlled collectively via the corresponding DCA operator (hereinafter also referred to as a "collective control operator") 211 or 212 with a same gain. As with to the above-described grouping feature, the forward (normal) or inverse operational direction can be set per assigned channel by means of predetermined setting operators (e.g., operators on the controller 110 and/or the pointing device etc. connected to the mixing console 106). For example, the input faders 201-2 and 201-n-1 may be assigned to the DCA fader 211 and may each be set to the forward or inverse operational directions. Note that the output from any desired one of the input faders may be supplied to a succeeding stage without passing through the DCA operator 211 or 212 (see "INn" in FIG. 3A).

FIG. 3A shows an example of assignment, to the DCA operators DCA1 and DCA2, of the input faders. "IF1" to "IFn" in the figure correspond to the input faders 201-1 to 201-n explained above in relation to FIG. 2. The outputs of these input faders are taken out for subsequent use separately from each other, as indicated by, for example, arrow 302. DCA assigner 301 assigns the output of each of the input faders to one of operators DCA1 and DCA2 that correspond to the DCA operators 211 and 212 shown in FIG. 2. By user's operation of one of the DCA operators, the signals from the input faders, assigned to the operated DCA operator, are collectively controlled in level with a same gain, so that there can be obtained DCA outputs DCAOUT1-1 to DCAOUT1-k or DCA outputs DCAOUT2-1 to DCAOUT2-k.

Further, FIG. 3B shows an assignment table indicating assignment, to the DCA operators, of the input faders. In the assignment table, "DCA CH" represents an ID (identifier) specifying one of the DCA operators; "DCA CH=1" represents the DCA operator DCA1 while "DCA CH=2" represents the DCA operator DCA2. "ASSIGNED INPUT CH" represents input channels assigned to the individual DCA operators DCA CH. In the figure, each of the input channels is indicated by the fader number of the corresponding input fader. In assigning the input channels assigned to the DCA operators, the forward or inverse operational direction can be designated or set for each of the input channels. "NML/INV" in the assignment table represents the designated operational direction; "NORMAL" represents the forward operational direction, while "INVERSE" represents the inverse direction opposite from the forward operational direction.

In the illustrated example of FIG. 3, the input faders IF2 and IFn-1 are assigned to the DCA operator DCA1, and the input fader IF2 and input fader IFn-1 are set to the forward (Normal) and Inverse operational directions, respectively. Thus, as the DCA operator DCA1 is operated in the level increasing direction, the signal from the input fader IF2 is also controlled in the level increasing direction while the signal from the input fader IFn-1 is controlled in the opposite direction, i.e. in the level decreasing direction. Note that a level control output produced by operation of any one of the DCA operators is used separately from the outputs from the individual input faders, so that any one of the input faders will not automatically operate in response to the operation of the DCA operator. Such level control by the DCA assigner 301 and DCA operators is implemented by the DSP 103 of FIG. 1.

Figure 4:
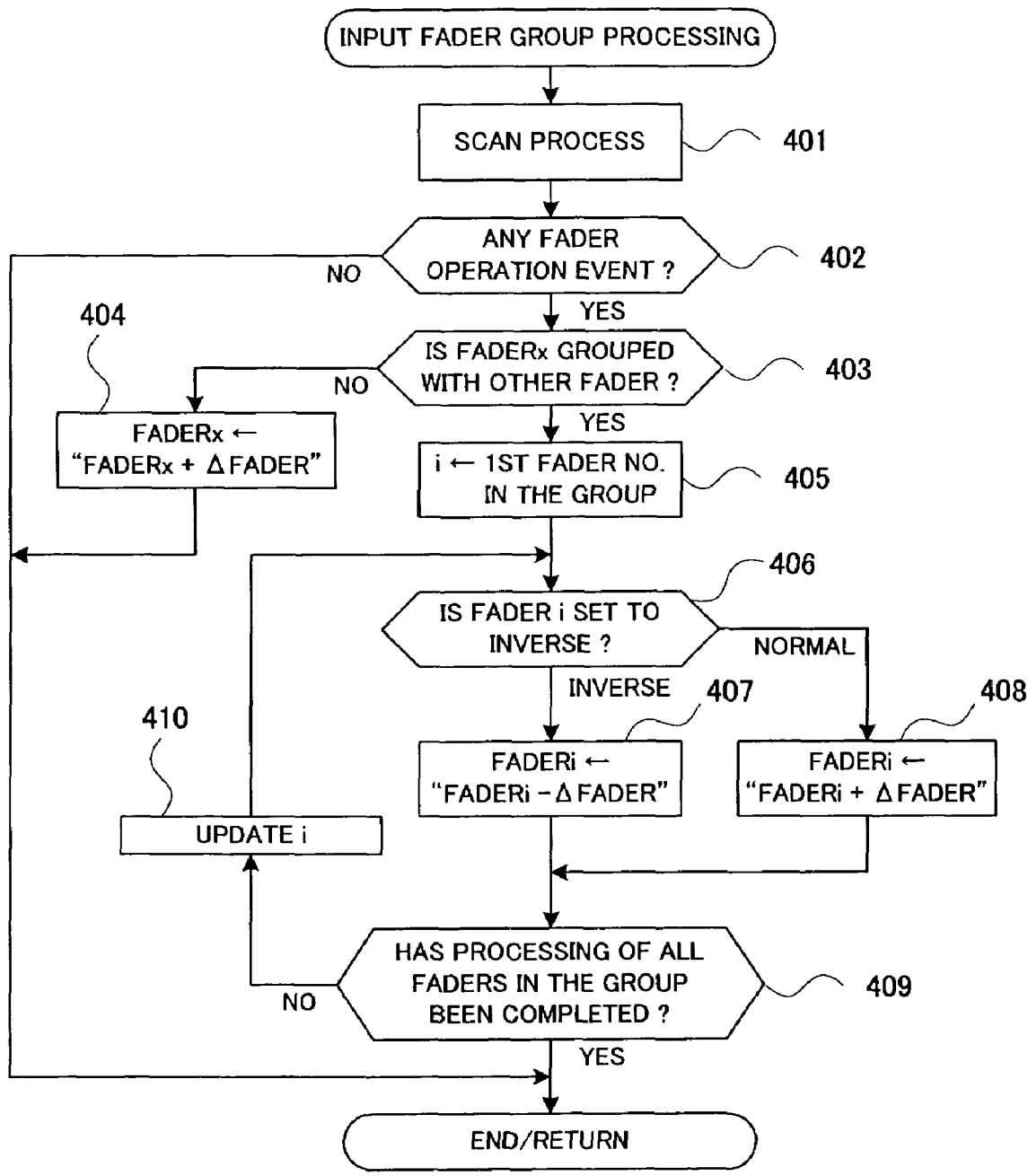
FIG. 4 is a flow chart of input fader group processing carried out in the embodiment.

FIG. 4 is a flow chart of input fader group processing executed in response to operation of any one of the input faders. At step 401, a scan process is carried out to determine whether or not any of the faders has been operated. If it is determined at step 402 that there has occurred an input fader operation event, the processing goes from step 402 to step 403, where it is further determined whether or not the operated input fader x is currently set as a component of any fader group, i.e. grouped with one or more other faders. If the operated fader x is not grouped with any other fader as determined at step 403, an operated amount ΔFADER of the fader x is added to a control value FADERx of the fader x, at step 404. If, on the other hand, the operated fader x is set as a component of a fader group as determined at step 403, then the first fader number in the group is set as an initial value of variable i. At next step 406, the operational direction to which the fader i is ascertained. If the ascertained operational direction of the fader i is "Forward (Normal)", the operated amount ΔFADER is added to a control value FADERi of the fader i, at step 408. If the ascertained operational direction of the fader i is "Inverse", the operated amount ΔFADER is subtracted from the control value FADERi of the fader i, at step 407. After steps 407 or 408, the processing goes to step 409, where a further determination is made as to whether the necessary operations have been completed for all the faders in the group. If one or more of the faders in the group remain to be subjected to the operations as determined at step 409, the next fader number in that group is set as the variable i at step 410, and then the processing reverts to step 406. Once step 409 determines that the necessary operations have been completed for all the faders in the group, the input fader group processing is brought to an end.

Note that the above-mentioned "control value" of the fader is a set value of the fader determined in accordance with operation of the fader and stored in a predetermined buffer. In practice, level control via the fader is performed by the DSP 103 multiplying the signal, assigned to the fader, by the control value of the fader. Let it be assumed that the control value of the fader can take any one of values within a predetermined range and is saturated when it reaches the upper or lower limit of the range.

Also assume that the operated amount ΔFADER of the fader takes a positive or negative sign in accordance with the operational direction set for the fader. For example, for each fader set to the Normal operational direction, the operated amount operated amount ΔFADER of the fader takes a positive value when the fader has been operated in the level increasing direction, but takes a negative value when the fader has been operated in the level decreasing direction. Similarly, for each fader set to the Inverse operational direction, the operated amount operated amount ΔFADER of the fader takes a negative value when the fader has been operated in the level increasing direction, but takes a positive value when the fader has been operated in the level decreasing direction. Therefore, when a particular fader, set to the Inverse operational direction, in a particular group has been operated in the level increasing direction, the operated amount operated amount ΔFADER of the fader takes a negative value; therefore, in this case, the level is controlled in the increasing direction at step 407 for each fader, set to the Inverse operational direction, in the particular group, but the level is controlled in the decreasing direction at step 408 for each fader, set to the Normal operational direction, in the particular group. Conversely, when a particular fader, set to the Inverse operational direction, in a particular group has been operated in the level decreasing direction, the operated amount operated amount ΔFADER of the fader takes a positive value; therefore, in this case, the level is controlled in the decreasing direction at step 407 for each fader, set to the Inverse operational direction, in the particular group, but the level is controlled in the increasing direction at step 408 for each fader, set to the Normal operational direction, in the particular group. In this manner, the instant embodiment allows the increasing or decreasing direction of the control value of the fader to coincide with the operated direction of the fader, irrespective of whether the fader is set to the Normal operational direction or the Inverse operational direction.

Figure 5:
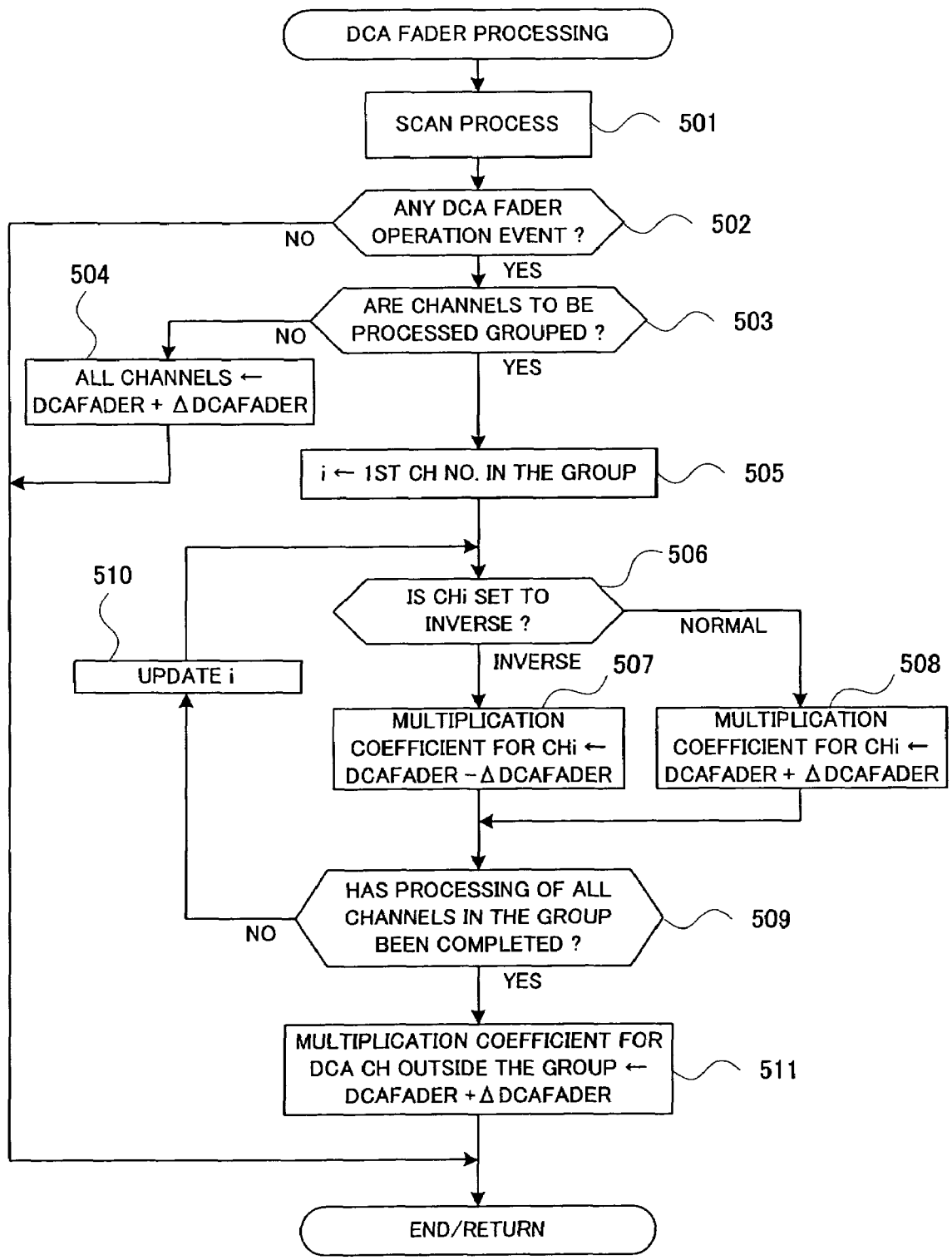
FIG. 5 is a flow chart of DCA fader processing carried out in the embodiment.

FIG. 5 is a flow chart of DCA fader processing. At step 501, a scan process is carried out to determine whether or not any of the DCA faders has been operated. If it is determined at step 502 that there has occurred a DCA fader operation event, the processing goes to step 503, where it is further determined whether or not the channels to be processed by the operated DCA are currently set as a channel group, i.e. whether signals of two or more of the input faders are assigned to the DCA fader as illustrated in FIG. 3. If answered in the negative at step 503, all of the channels to be processed are individually subjected to control by the operated DCA fader. Namely, at step 504, an operated amount ΔDCAFADER of the DCA fader is added to a control value DCAFADER of the DCA fader, and level control is performed using the result of the addition as a multiplication coefficient for the signals of all the channels. This is because, in the instant embodiment, the gain of the DCA fader is normally set to be the same for all the channels.

Note that the above-mentioned "control value" of the DCA fader is a set value of the fader determined in accordance with operation of the fader and stored in a predetermined buffer. In practice, level control via the DCA fader is performed by the DSP 103 multiplying the signals of the individual channels by the control value of the fader. The operated amount ΔDCAFADER of the DCA fader takes a positive value when the DCA fader is operated in the level increasing direction, but takes a negative value when the DCA fader is operated in the level decreasing direction.

If the channels to be processed by the operated DCA are currently set as a channel group as determined at step 503, the first channel number in that group is set as an initial value of variable i. At next step 506, it is determined whether or not the channel CHi is set to the Inverse operational direction. If the channel CHi is set to the Normal operational direction, a value obtained by adding the operated amount ΔDCAFADER of the DCA fader to the control value DCAFADER of the DCA fader is set as a multiplication coefficient of the channel CHi. If the channel CHi is set to the Inverse operational direction, a value obtained by subtracting the operated amount ΔDCAFADER from the control value DCAFADER of the DCA fader is set as the multiplication coefficient of the channel CHi.

After steps 507 or 508, the processing goes to step 509, where a further determination is made as to whether the necessary operations have been completed for all the channels in the group. If one or more of the channels in the group remain to be subjected to the operations as determined at step 509, the next channel number in that group is set as the variable i at step 510, and then the processing reverts to step 506. Once step 509 determines that the necessary operations have been completed for all the channels in the group, the DCA fader processing is brought to an end after control is performed at step 511 on a multiplication coefficient of the DCA channels outside that group. Note that step 511 may be dispensed with.

In the instant embodiment, the faders are grouped and set to the forward (normal) or inverse operational direction, as described above. Such arrangements allow crossfade to be performed appropriately with utmost ease, in response to user's operation of only one of the faders in a desired group. Note that the tone volume levels to be crossfaded may be increased and decreased at any desired rate. For example, a level of a desired fader when a predetermined channel is assigned to the fader may be stored so that the crossfade is effected in dB levels on the basis of the stored level. As one option, the user may be allowed to select a particular dB level at which the crossfade should take place and/or a particular crossfade curve, such as a linear, sine (sinusoidal) or inverse sine curve in dB levels.

Further, whereas the embodiment of the present invention has been described above in relation to the case where the operators are faders, the present invention is also applicable to other types of operators.

In summary, the present invention is characterized in that a plurality of operators, such as faders, are each set to one of opposite operational directions so that operating only one of the operators can control a particular control value in the opposite directions. With the thus-arranged present invention, desired crossfade can be readily performed in an appropriate manner by operation of only one of the operators. The present invention is also characterized in that a plurality of channels are each set to one of opposite operational directions so that operating only one of collective control operators can control a particular control value in the opposite directions. With the thus-arranged present invention, desired crossfade can be readily performed in an appropriate manner by operation of only one of the collective control operators.

The present invention relates to the subject matter of Japanese Patent Application No. 2002-205404 filed on Jul. 15, 2002, the disclosure of which is expressly incorporated herein by reference in its entirety.

What is claimed is:

1. A level adjustment apparatus including a plurality of operators each operable in both a level increasing direction and a level decreasing direction, individual ones of said operators having respective set values associated therewith, said level adjustment apparatus comprising:

a grouping section that individually sets each of operators, selected from among said plurality of operators, to a forward or inverse operational direction, so that at least one operator is set in the forward operational direction and at least one operator is set to the inverse operational direction, and groups the selected operators into one or more groups;

a level control section that, when any one of said operators in one of the groups is operated, controls each of the set values of the operators in the one group in accordance with an operated amount generated through operation of the operated operator in such a manner that the set value of the at least one operator set to the forward operational direction is controlled by adding the operated amount while the set value of the at least one operator set to the inverse operational direction is controlled by subtracting the operated amount, wherein a sign of a value of the operated amount is same for a first case where the operated operator is an operator set to the forward operational direction and has been operated in an increasing direction and a second case where the operated operator is an operator set to the inverse operational direction and has been operated in a decreasing direction, and the sign of the value of the operated amount is same between a third case where the operated operator is an operator set to the forward operational direction and has been operated in the decreasing direction and a fourth case where the operated operator is an operator set to the inverse operational direction and has been operated in the increasing direction, the sign of the value of the operated amount being different between the first and second cases and the third and fourth cases, whereby, when any one of said operators in one of the groups is operated in a particular direction, said level control section performs control to actually move a respective position of each of other said operator in the one group, set to a same operational direction as the operated operator, in a same direction as the particular direction in which the one operator is operated, and performs control to actually move a respective position of each of other said operator in the one group, set to an opposite operational direction from the operated operator, in an opposite direction from the particular direction;

a grouped state display section that displays respective grouped states of said operators grouped by said grouping section; and an operational direction display section that displays respective operational directions of said operators set via said grouping section.

2. A level adjustment apparatus for controlling control values of a plurality of operators each controllable in both a level increasing direction and a level decreasing direction, said level adjustment apparatus comprising:

a collective control operator that collectively controls the control values of said plurality of operators;

a setting section that individually sets each of said plurality of operators to a forward or inverse operational direction, so that at least one operator is set in the forward operational direction and at least one operator is set to the inverse operational direction;

a level control section that, when said collective control operator is operated, controls each of the control values of said plurality of operators in accordance with an operated amount generated through operation of the collective control operator in such a manner that the control value of the at least one operator set to the forward operational direction is controlled by adding the operated amount while the control value of the at least one operator set to the inverse operational direction is controlled by subtracting the operated amount, wherein a sign of a value of the operated amount is different between a first case where the collective control operator is operated in an increasing direction and a second case where the collective control operator is operated in a decreasing direction, whereby, when said collective control operator is operated in a particular direction, performs control to actually move a respective position of each of said plurality of operators, set to the forward operational direction, in a same direction as the particular direction in which said collective control operator is operated, and performs control to actually move a respective position of each of said plurality of operators, set to the inverse operational direction, in an opposite direction from the particular direction; and a display section that displays respective ones of the operational directions of said plurality of operators set via said setting section.

3. A level adjustment apparatus for controlling control values of a plurality of operators each controllable in both a level increasing direction and a level decreasing direction, said level adjustment apparatus comprising:

a collective control operator that collectively controls the control values of said plurality of operators;

a setting section that assigns at least two operators, selected from among said plurality of operators, to said collective control operator, and individually sets each of said at least two operators, assigned to said collective control operator, to a forward or inverse operational direction so that at least one operator is set in the forward operational direction and at least one operator is set to the inverse operational direction;

a level control section that, when said collective control operator is operated, controls each of the control values of said at least two operators in accordance with an operated amount generated through operation of the collective control operator in such a manner that the control value of the at least one operator set to the forward operational direction is controlled by adding the operated amount while the control value of the at least one operator set to the inverse operational direction is controlled by subtracting the operated amount, wherein a sign of a value of the operated amount is different between a first case where the collective control operator is operated in an increasing direction and a second case where the collective control operator is operated in a decreasing direction, whereby, when said collective control operator is operated in a particular direction, performs control to actually move a respective position of each of said at least two operators, assigned to said collective control operator and set to the forward operational direction, in a same direction as the particular direction in which said collective control operator is operated, and performs control to actually move a respective position of each of the operators, assigned to said collective control operator and set to the inverse operational direction, in an opposite direction from the particular direction; and a display section that displays respective ones of the operational directions of said plurality of channels set via said setting section.

4. A level adjustment apparatus as claimed in claim 1 wherein said plurality of operators are provided in corresponding relation to channels, and each of said operators is used to adjust a volume level of an audio signal of a corresponding one of the channels.

5. A level adjustment apparatus as claimed in claim 2 wherein said plurality of operators are provided in corresponding relation to channels, and each of said operators is used to adjust a volume level of an audio signal of a corresponding one of the channels.

6. A level adjustment apparatus as claimed in claim 3 wherein said plurality of operators are provided in corresponding relation to channels, and each of said operators is used to adjust a volume level of an audio signal of a corresponding one of the channels.

* * * * *